May 15, 1951 T. A. READ ET AL 2,552,586

AUTOMATIC VOLUME CONTROL

Filed Feb. 19, 1947 2 Sheets-Sheet 1

Inventors
THOMAS A. READ,
HERBERT I. FUSFELD,

By
G. J. Kessenich, J. H. Church + H. E. Thibodeau
Attorneys

Inventors
THOMAS A. READ,
HERBERT I. FUSFELD,

By
G. J. Kessenich, J. H. Church & H. E. Thibodeau
Attorneys

Patented May 15, 1951

2,552,586

UNITED STATES PATENT OFFICE 2,552,586

AUTOMATIC VOLUME CONTROL

Thomas A. Read and Herbert I. Fusfeld,
Philadelphia, Pa.

Application February 19, 1947, Serial No. 729,639

2 Claims. (Cl. 179—171)

(Granted under the act of March 3, 1883, as amended April 30, 1928; 370 O. G. 757)

The invention described herein may be manufactured and used by or for the Government for governmental purposes without the payment of any royalty thereon.

This invention relates to a control circuit for maintaining an electric signal at a constant strength.

This invention has wide applications since it may be applied to apparatus for testing metal by sonic methods, or as an automatic volume control in radio communication receivers and in other vacuum tube amplifying circuits, the gain of which it is desired to vary in accordance with the strength of some signal.

One object of this invention is to provide a gain-control circuit in which the control grid of an electronic tube is especially arranged to operate upon decreases in rather than increases in superimposed negative bias.

It is another object of this invention to provide, in an amplifying circuit having a voltage amplifying tube, a diode rectifier tube whose cathode is connected to the plate of the voltage amplifier tube and whose plate is normally maintained at a sufficient negative voltage so that passage of a direct current through the diode rectifier tube causes the control grid of the voltage amplifier tube to be less negative than the negative bias at which it is normally maintained.

It is a further object of this invention to provide, in an electric control circuit having a voltage amplifier tube and a diode rectifier tube and in which the operating plate voltage of the voltage amplifier tube is maintained at a relatively low value, means for maintaining the screen grid voltage of the voltage amplifier tube at a relatively high value which remains constant as the control grid voltage is changed.

It is a still further object of this invention to provide a method of stabilizing a voltage in which the negative voltage bias applied to the control grid of a voltage amplifier tube is varied in accordance with the variations in a voltage which is to be stabilized and within a range below that value of the negative voltage bias at which maximum voltage amplification is secured in said voltage amplifier tube.

These and other objects of this invention will be readily apparent to those skilled in the art, or will be made known from the accompanying drawings and specification to which reference is here made for a further exposition of this invention and at the end whereof the specific features which it is desired to protect by Letters Patent are claimed.

Figure 1:
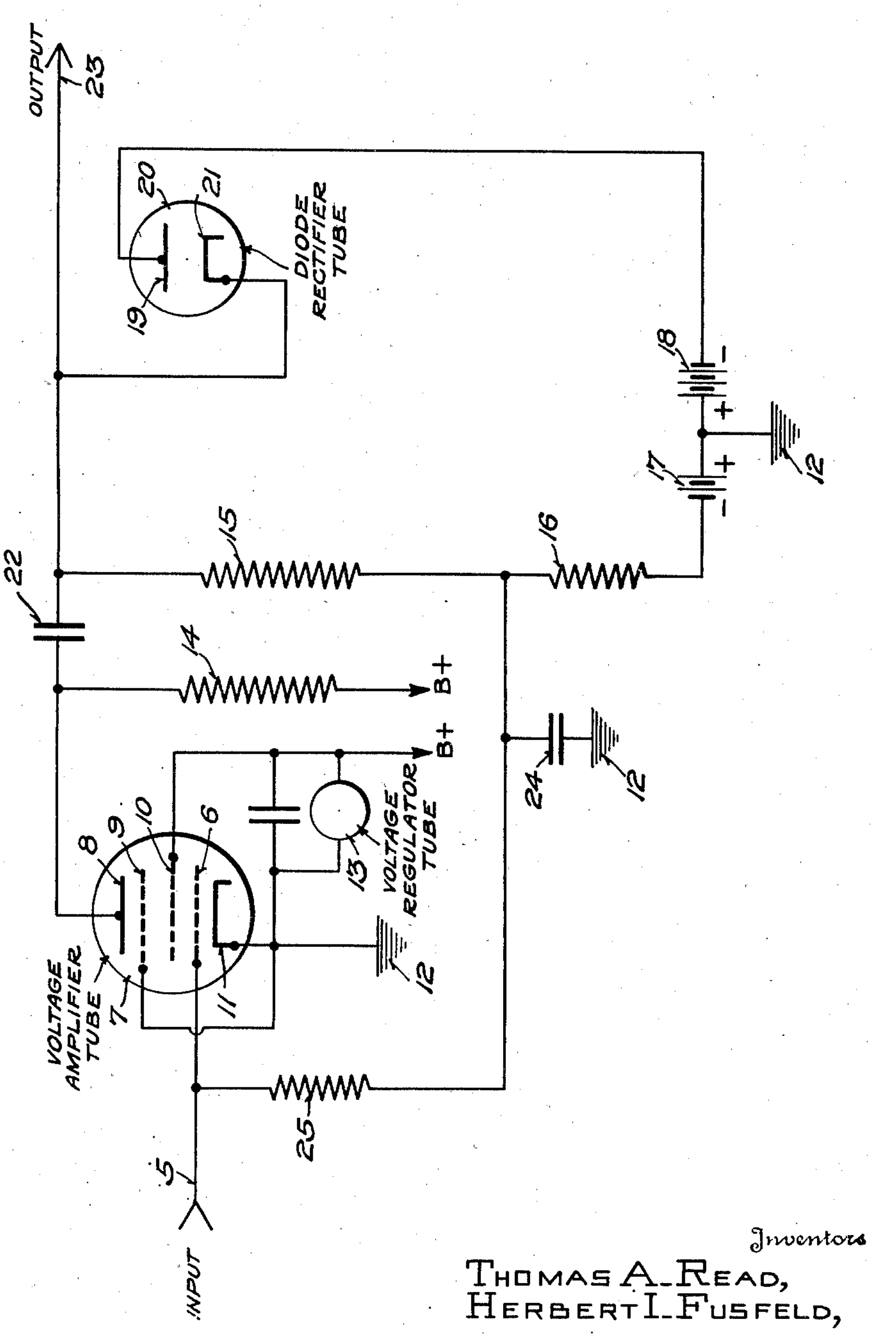
Fig. 1 is an electric circuit diagram.

That embodiment of the invention selected for illustration in the accompanying circuit diagram (Fig. 1) is made up of an input terminal 5 connected to the control grid 6 of a voltage amplifier tube 7. Tube 7 may be a tube identified by Radio Corporation of America Type No. 6K7. Tube 7 is shown as being a pentode which is a triple-grid, super-control amplifier of the heater-cathode type. It is recommended for service in the radio-frequency (R-F) or intermediate-frequency (I-F) stages of radio receivers. It has the ability to handle unusual signal voltages without cross-modulation and modulation-distortion so that it is adaptable to the R-F and I-F stages of radio receivers employing automatic volume control (AVC). Tube 7 has a plate 8, a suppressor grid 9, a screen grid 10, and a cathode 11.

Cathode 11 is connected to ground 12. Screen grid 10 is connected to the positive pole of the B battery or other source of direct current. To maintain the voltage of screen grid 10 constant while the voltage of control grid 6 is varied, a voltage regulator tube 13 is connected between the ground 12 of cathode 11 and the screen grid 10.

A load resistor 14 is connected between plate 8 and the positive terminal of the B battery or other source of direct current. A second resistor 15 is connected to plate 8 and is connected at its opposite end to an AVC resistor 16 in series with a battery 17 connected at its opposite end to ground 12. Battery 18 is connected in opposite or bucking relation to battery 17 so that the positive pole of battery 18 is also connected to ground 12. The negative pole of battery 18 is connected to the plate 19 of a diode rectifier tube 20 whose cathode 21 is connected to plate 8 through a blocking condenser 22 which forms part of the output terminal connection 23.

An AVC filter is connected at one side between resistors 15 and 16. This AVC filter comprises a condenser 24 and a resistor 25 connected by means of the input terminal 5 to control grid 6.

Figure 2:
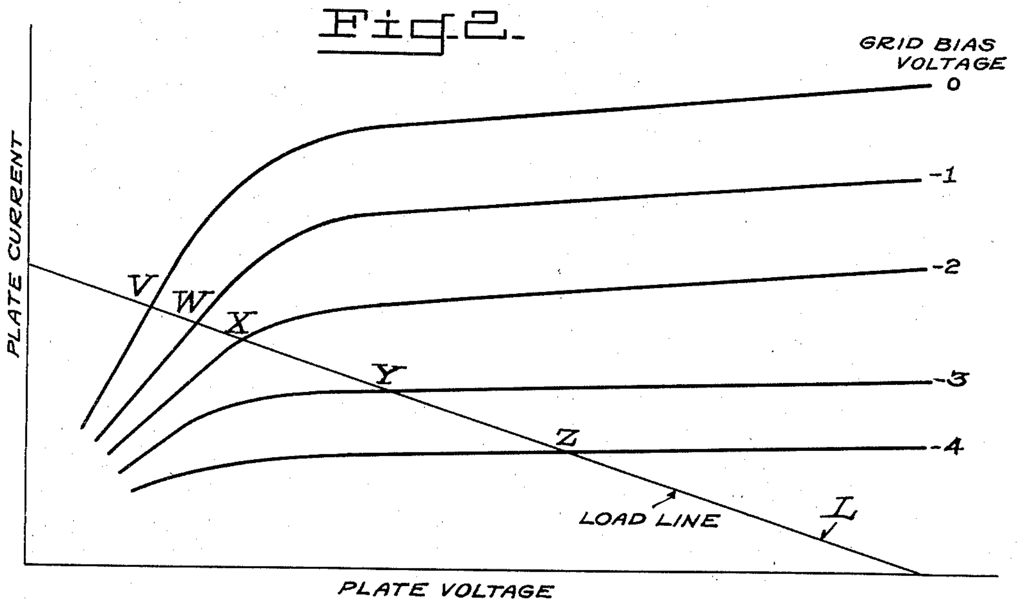
Fig. 2 is a graphic representation of characteristic curves showing the plate voltage-plate current of a pentode voltage amplifier tube.

Fig. 2 shows schematically the plate voltage-plate current characteristic curves for a typical pentode voltage amplifier tube such as tube 7. The load line L is drawn corresponding to the value of the plate load resistor 14 and of the plate supply voltage. The intersection of this load line with a characteristic curve gives the value of the plate voltage which corresponds to any given grid voltage. It will be noted that these points of intersection are much closer together for small grid bias voltages than for large grid bias voltages because of the greatly increased slope of the current vs. voltage curves at low plate voltages, that is to say, in Fig. 2, the distance VW or WX is much less than the distance XY or YZ, all these distances being measured along the load line L.

Figure 3:
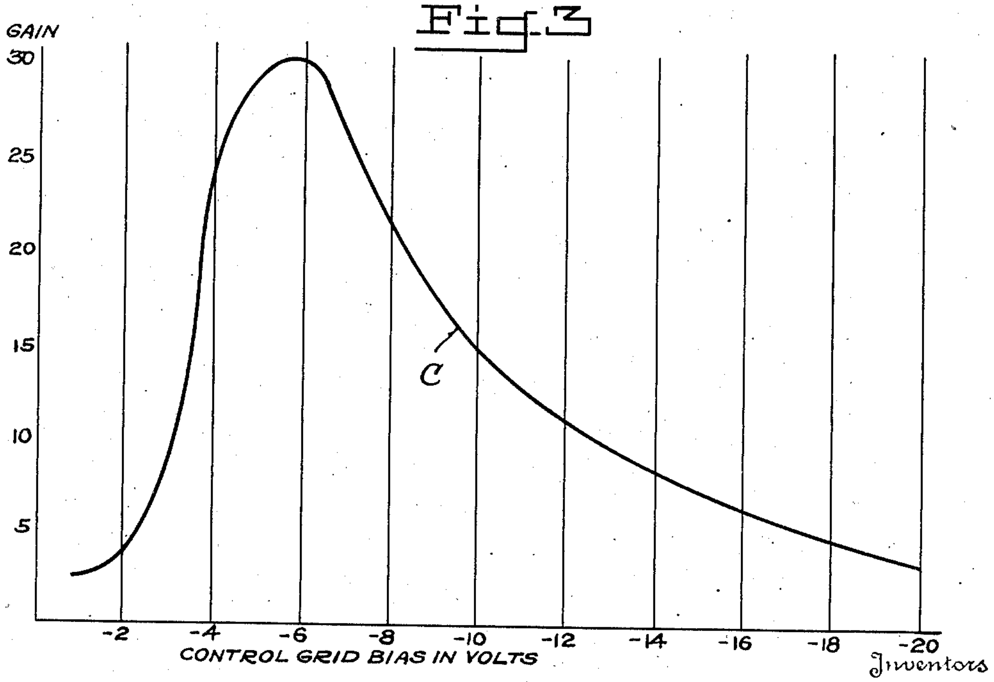
Fig. 3 is a graphic representation in which voltage gain of a voltage amplifier tube is plotted against control grid voltage of the same tube.

The advantage of this invention over the conventional AVC circuit is shown in Fig. 3. The curve C in Fig. 3 plots the data obtained as the result of a dynamic test of a 6K7 or a 6SK7 tube using a plate resistor of 50,000 ohms, a plate supply voltage of 350 volts, and a screen grid voltage of 118 volts. In this figure, the voltage gain is plotted as a function of the control grid voltage. In the conventional AVC circuit, the control grid bias potential is always numerically greater than the value at which the gain is maximum. A reduction in gain is effected by increasing the bias. In this new circuit, the control grid bias voltage is always less than the value at which the gain is maximum. A reduction of gain is effected by decreasing the bias.

From Fig. 3 it is apparent that a much more rapid change in gain, as the grid bias is changed, is achieved by the new circuit than by those heretofore used.

The operation of that modification of the device shown in Fig. 1 is as follow. The signal to be amplified is applied through the input connection 5 to the control grid 6 of the voltage amplifier tube 7. The amplified signal appears across resistor 14 and is applied to the electrodes 19 and 21 of diode rectifier tube 20. In the absence of a signal and at a steady state of current, a constant voltage equal to the difference between the voltages of batteries 17 and 18 appears between the plate 19 and the cathode 21 of the diode rectifier tube 20. The plate 19 is negative with respect to the cathode 21. Likewise control grid 6 of voltage amplifier tube 7 is negative with respect to ground. If the magnitude of the amplified signal from the tube 7 is increased until the peak value of the alternating voltage appearing across resistor 15 exceeds the voltage difference of battery 18 minus battery 17, current will flow through the diode rectifier tube 20. This current causes a voltage drop across resistor 16. This voltage drop makes the control grid 6 of tube 7 less negative and thus decreases the amplification factor of tube 7 in the manner described below.

This improved method of AVC operates by shifting the operating point of the tube from a plate voltage at which the characteristic curves (as seen in Fig. 2) have a small slope to a lower plate voltage at which the slope is much greater. In this region of increased slope the amplification factor of the tube is greatly reduced.

It is important to the functioning of this circuit that the voltage of screen grid 10 be held constant as the voltage of control grid 6 is changed. One way of accomplishing this is shown in Fig. 1 wherein the voltage regulator tube 13 is shown connected between the screen grid 10, and the ground 12 connected to cathode 11.

In general terms, this improved method of AVC operates through using an increase in signal level to decrease the bias on the control grid 6. The plate voltage supply circuit has a high resistance (14) whereas the screen grid voltage supply has a very low resistance.

We claim:

1. In an electric circuit for controlling the amplification applied to an electric signal passing through said circuit, a vacuum tube having at least five electrodes consisting of a cathode, control grid, screen grid, suppressor grid, and plate for connection to a load, a supply voltage connected to the plate of said tube, a separate voltage supply connected to the screen grid of said tube for maintaining it at a higher constant voltage than said plate, a biasing voltage source applied to the control grid and of such magnitude that said tube operates below the knee of the characteristic gain, control grid bias curve, a condenser in series between plate and the load, a rectifier connected between the load end of the condenser and cathode, and a circuit connected across the rectifier and to the control grid for applying a voltage of opposite polarity to the grid bias voltage with an increase of signal applied to the control grid.

2. In an electric circuit for controlling the amplification applied to an electric signal passing through said circuit, a vacuum tube having at least five electrodes consisting of a cathode, control grid, screen grid, suppressor grid and plate, a supply voltage connected to the plate of said tube, a separate voltage supply connected to the screen grid of said tube for maintaining it at a higher constant voltage than said plate, a negative biasing voltage source applied to the control grid and of such magnitude that said tube operates to maintain the gain of the tube at a high level, a rectifier in the plate-cathode circuit of the tube, and a circuit connected between the output of the rectifier and the control grid for applying a positive voltage to said grid to reduce the gain with an increase of signal applied to the control grid.

THOMAS A. READ.
HERBERT I. FUSFELD.

REFERENCES CITED

The following references are of record in the file of this patent:

UNITED STATES PATENTS

| Number | Name | Date |
|---|---|---|
| 1,959,010 | Tellegen | May 15, 1934 |
| 1,985,352 | Numans | Dec. 25, 1934 |
| 2,010,253 | Barbon | Aug. 6, 1935 |
| 2,083,626 | Wirin | June 15, 1937 |
| 2,120,995 | Van de Riet | June 21, 1938 |
| 2,175,990 | Hirsch | Oct. 10, 1939 |
| 2,259,873 | Baumgartner | Oct. 21, 1941 |